United States Patent [19]

Schodl

[11] Patent Number: 4,851,697
[45] Date of Patent: Jul. 25, 1989

[54] APPARATUS FOR MEASURING FLOW VECTORS IN GAS CURRENTS

[75] Inventor: Richard Schodl, Troisdorf-Eschmar, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 84,613

[22] Filed: Aug. 12, 1987

[30] Foreign Application Priority Data

Sep. 19, 1986 [DE] Fed. Rep. of Germany ....... 3631900

[51] Int. Cl.$^4$ ............................................. G01N 15/06
[52] U.S. Cl. ........................................ 250/574; 356/28
[58] Field of Search .................. 356/28, 28.5; 250/574, 250/573; 73/861.04, 861.05; 350/96.15

[56] References Cited

U.S. PATENT DOCUMENTS

| 4,537,503 | 8/1985 | Liu | 356/28 |
| 4,575,238 | 3/1986 | Knuhtsen et al. | 356/28 |
| 4,713,537 | 12/1987 | Kunz et al. | 219/121 LU |

FOREIGN PATENT DOCUMENTS 2109548  6/1983  United Kingdom .

OTHER PUBLICATIONS

Brown & Pike, Combined Laser Doppler and time of flight anemometer, 0030-3997/78/060317-03, 1978 lpc business press.

Primary Examiner—David C. Nelms
Attorney, Agent, or Firm—Spensley Horn Jubas & Lubitz

[57] ABSTRACT

An optical head, to which laser light is supplied, produces, in a measuring volume, at least two focusing points at which particles flowing through the measuring volume are illuminated and cause scattered radiation which is collected by the optical head. The laser beam is directed, via at least one first light guide, to the optical head. From the optical head, the radiation received from the measuring volume is supplied, via at least one second light guide, to a light receiving means. The optical head is small-sized and may be rotated about its optical axis by means of a rotating device.

14 Claims, 8 Drawing Sheets

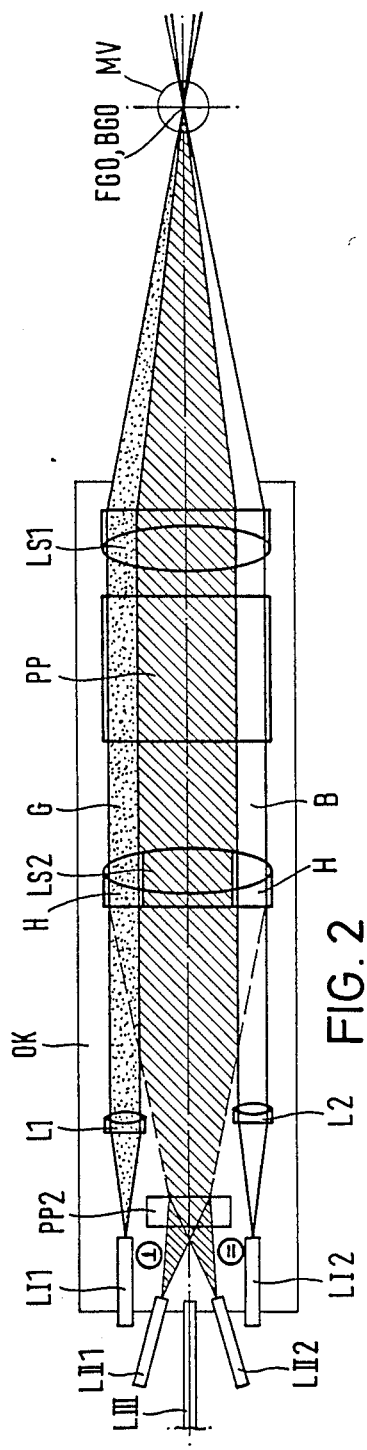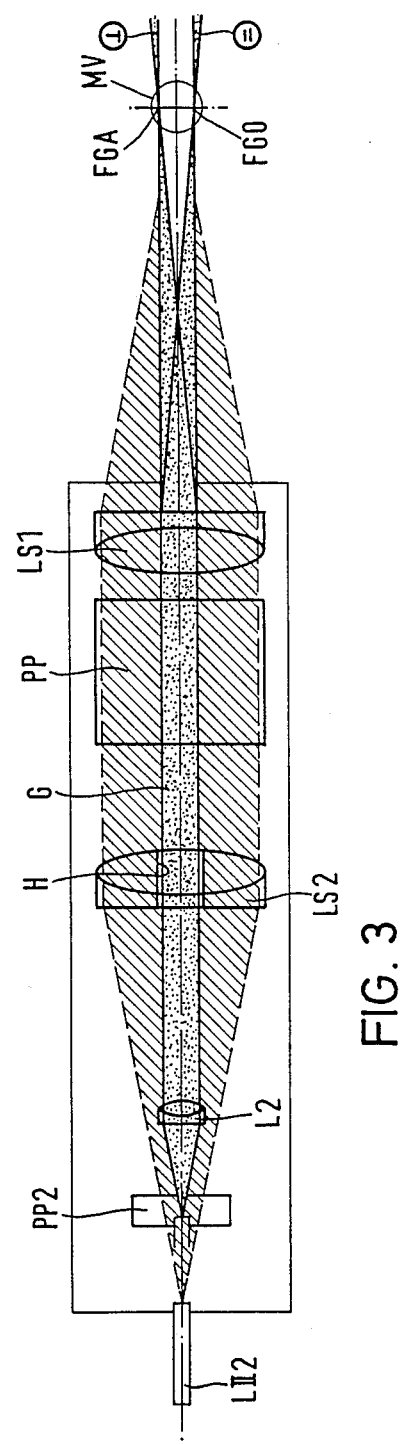

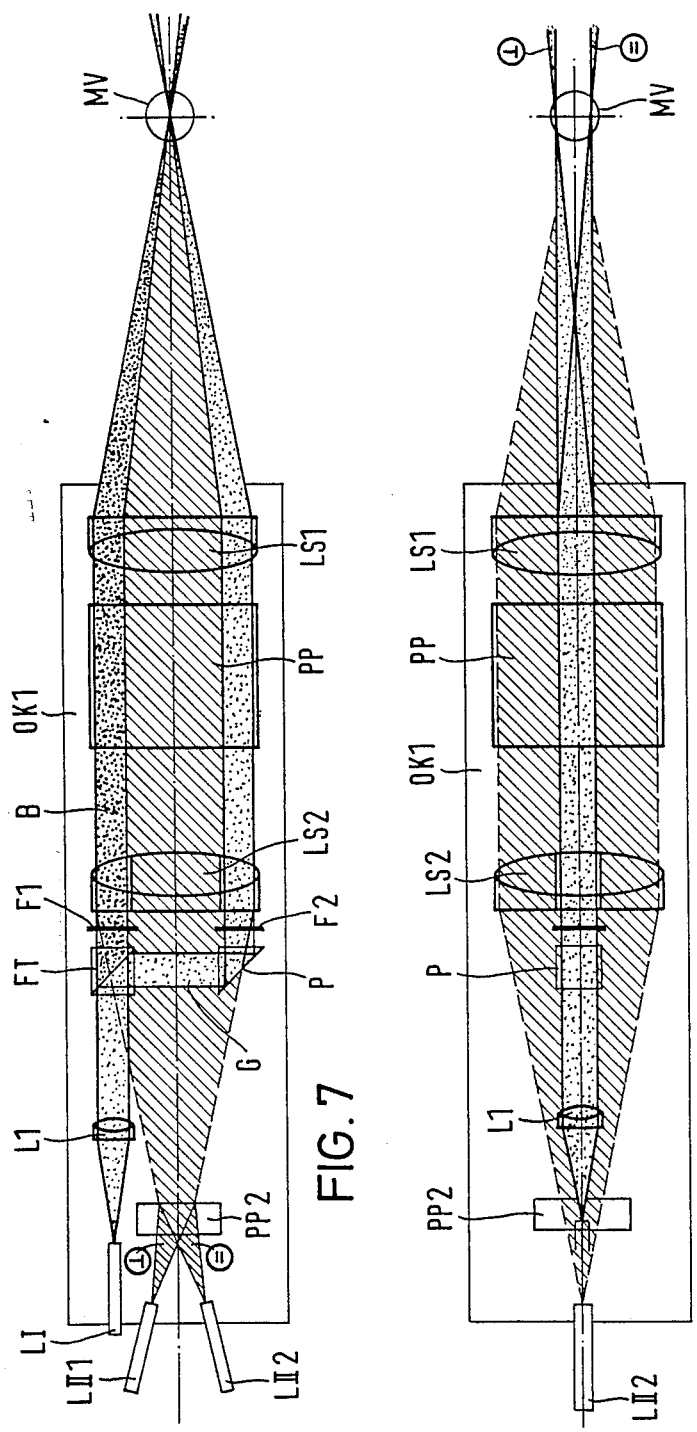

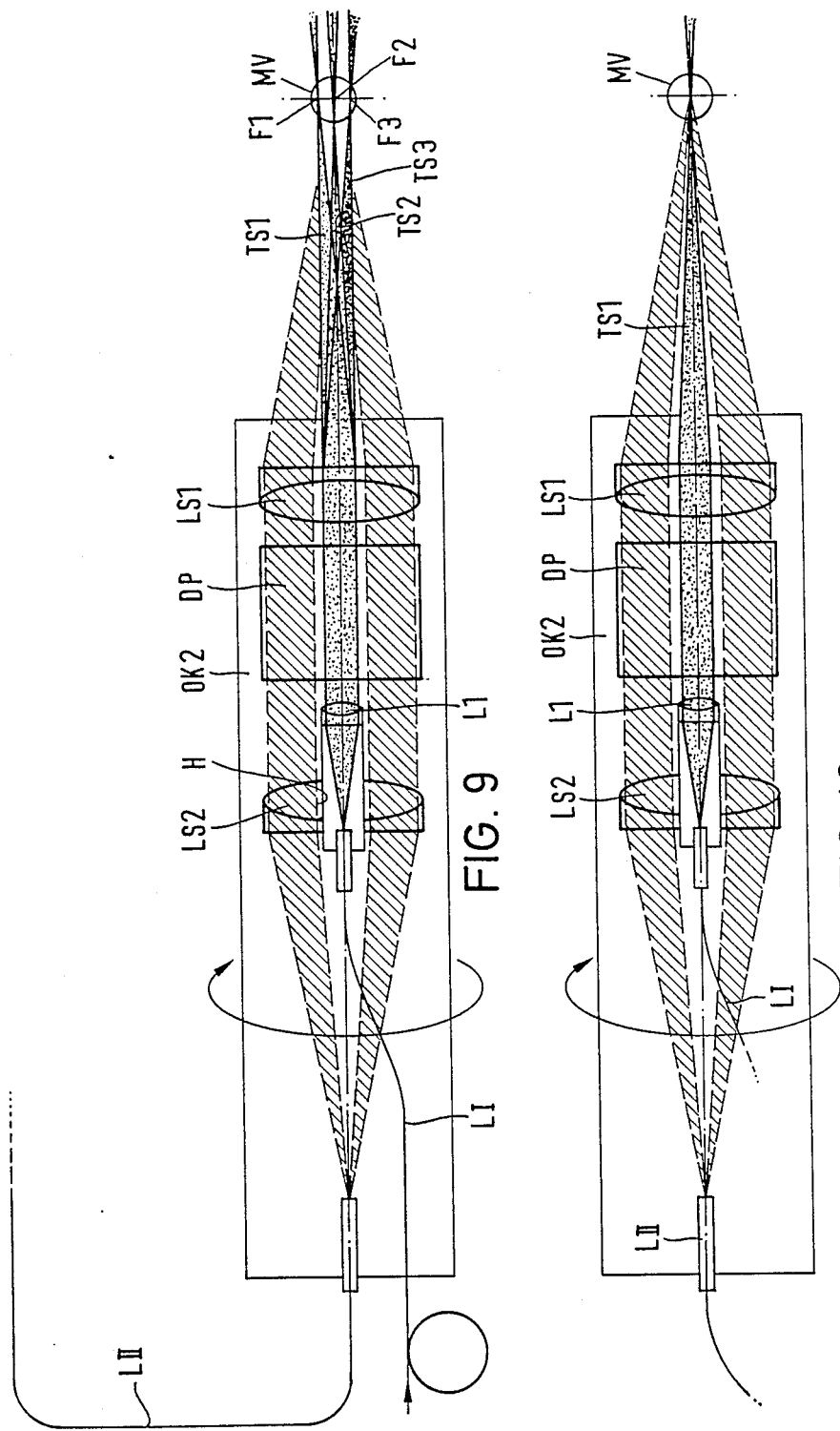

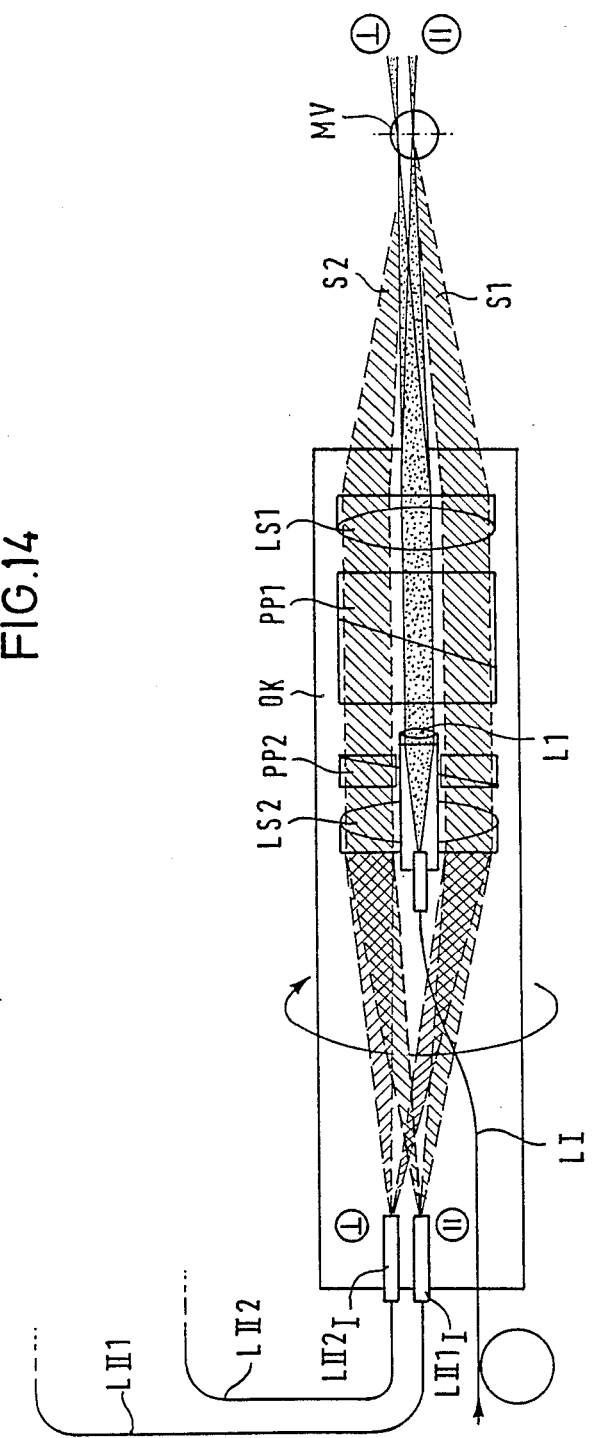

APPARATUS FOR MEASURING FLOW VECTORS IN GAS CURRENTS

BACKGROUND OF THE INVENTION

1. Field of the Invention

The invention relates to an apparatus for measuring flow vectors in gas currents.

2. Description of Related Art

U.S. Pat. No. 3,941,744 discloses an optical device in which a light beam emitted from a light source is divided into two partial beams, each of which is focused in the measuring volume. Solid particles contained in the flow and traversing a focusing point, flash up, and said flash up is detected by an analyzer. If the flow vector of a particle is in alignment with a straight line traversing both focusing points, a start pulse is produced at the first focusing point and a stop pulse at the second focusing point. From the time interval between said pulses, the flow rate, i.e. the vector amount, may be detected. The measuring expenditure involved with said two focus-processes is quite time-consuming. Only such flow vector components which are situated in a plane extending vertically to the optical axis of the system may be measured. Said plane must be determined by a series of measurements. The component extending in parallel to the optical axis cannot be determined.

British patent No. 2,109,548 describes a further development of the stated double-focus process. According to said British patent, it is also possible to measure a flow vector component extending in parallel to the optical axis of the system so that the flow vectors may be determined completely as to amount and direction. In this process, called the three-component process, a multicolored laser beam is split into two components of different colors. Each of said components is split up into two partial beams which are polarized vertically to each other. Thus, there are formed four partial beams in total of which two always intersect in the measuring volume and form a focusing point. One focusing point is situated on the optical axis of the system. By turning an image rotating prism, the position of the other focusing point may be easily changed. In order to evaluate the flashes produced by the flowing particles, the radiation of said flashes is selected, depending on polarization and color, in order to generate the start and stop pulses.

Due to the beam splitting, to the subsequent out-reflection out of the incident radiation of the radiation components emerging from the measuring volume, and to the need for ensuring a spatial separation of the beam components, the known devices require much space. These measuring instruments, being of extensive volume, may not be used under restricted room conditions.

It is an object of the invention to provide a device for measuring flow vectors in gas currents that may be used in restricted space conditions and for which the measuring setup is simple and more easily controllable.

SUMMARY OF THE INVENTION

The optical elements of the preferred embodiment of the present invention, such as the lens systems, beam divider, etc., are accommodated in a small-type elongated optical head forming a separate unit provided with light via light guides and from which the light beams emitted from the measuring volume are also uncoupled via light guides in order to be conducted to the external light receiving means. In the preferred embodiment of the invention, it is not only possible to closely approach, with a small-type optical head, the measuring volume without any material obstacle, but the system may be also set up in a modular way and, if necessary, different optical heads may be connected optionally to the laser beam source or to the light receiving means. As a result, the system is not only versatile as to its material setup, but also as to the combination of its individual components. The invention may be used with the two-component-measuring process as well as with the three-component-measuring process. The light beam emitted from the laser source may be split up either in an external splitting unit, and, to this effect, two first light guides at juxtaposed sites are directed into the optical head, or it may be split up inside the optical head which, in such a case, contains a beam divider.

Preferably, the optical head is a tubular elongated unit, rotatable about its longitudinal axis which coincides with the optical axis of the system. Thus, it is possible to change, by a simple rotation of the optical head, the direction of the straight line traversing the focusing points so that the system may be easily adjusted to flow vectors of different directions.

Suitably, all of the light guides connected to the optical head are accommodated in a common sleeve in the form of a flexible metal jacket which extends from the optical head to a distributer unit. From the distributer unit, the light guides extend, on the one hand, to elements adapted to couple the laser beam in the first light guide or guides, and, on the other hand, to the light receiving means in which light emerges from the second light guides to be conducted to photoreceivers.

The first light guides used are single mode light guides which, in a glass jacket, contain a light conductive, thin core having a diameter of about 3 um and which are qualified not to change the characteristics of the laser beam. It is difficult to couple said single mode light guides which, preferably, continuously extend through the distributer unit to the optical head. The second light guides, provided as the light return line, may be of the multimode light guide type, the core diameter of which is about 50 um. While such multimode light guides ensure that the incident light is further conducted, overlappings causing a stainy image of said light beam occur due to multiple wall reflections in the cross section of the emerging light beam. On the other hand, multimode light guides may be coupled relatively easily. In one embodiment of the invention, the single mode light guide type is used for the first light guides (moving forward), while the second light guides (returning are of the multimode light guide type.

To couple the laser light into the first light guides, it is necessary to accurately adjust the input ends of said light guides with respect to the laser beam. Said adjustment may be realized by a control unit to which light received in the optical head from a first light guide, is conducted via a third light guide extending from the optical head to the control unit. Due to the control unit, the position of the coupling element by which the laser light is coupled into the first light guide may be changed within various degrees of freedom. The change is made in that the setting of the coupling element is fixed if, via the third light guide, an indication shows that the optical head receives maximum light intensity via the first light guide.

BRIEF DESCRIPTION OF THE DRAWINGS

FIG. 2 is a schematic longitudinal section of the optical head of the embodiment of FIG. 1.

FIG. 3 is a section of the optical head at right angles to that of FIG. 2.

FIG. 7 is a schematic vertical section of another embodiment of the optical head employing the three-component measuring process, wherein, unlike FIG. 2, only one sole first light guide is provided.

FIG. 8 shows a vertical section of the optical head of FIG. 7

FIG. 9 shows a vertical section of an embodiment of an optical head for a multicolor system in which more than two focusing points are produced in the measuring volume.

FIG. 10 shows a horizontal section of the optical head of FIG. 9.

FIG. 14 shows an example with polarization-dependent beam splitting.

DESCRIPTION OF THE PREFERRED EMBODIMENT

Figure 1:
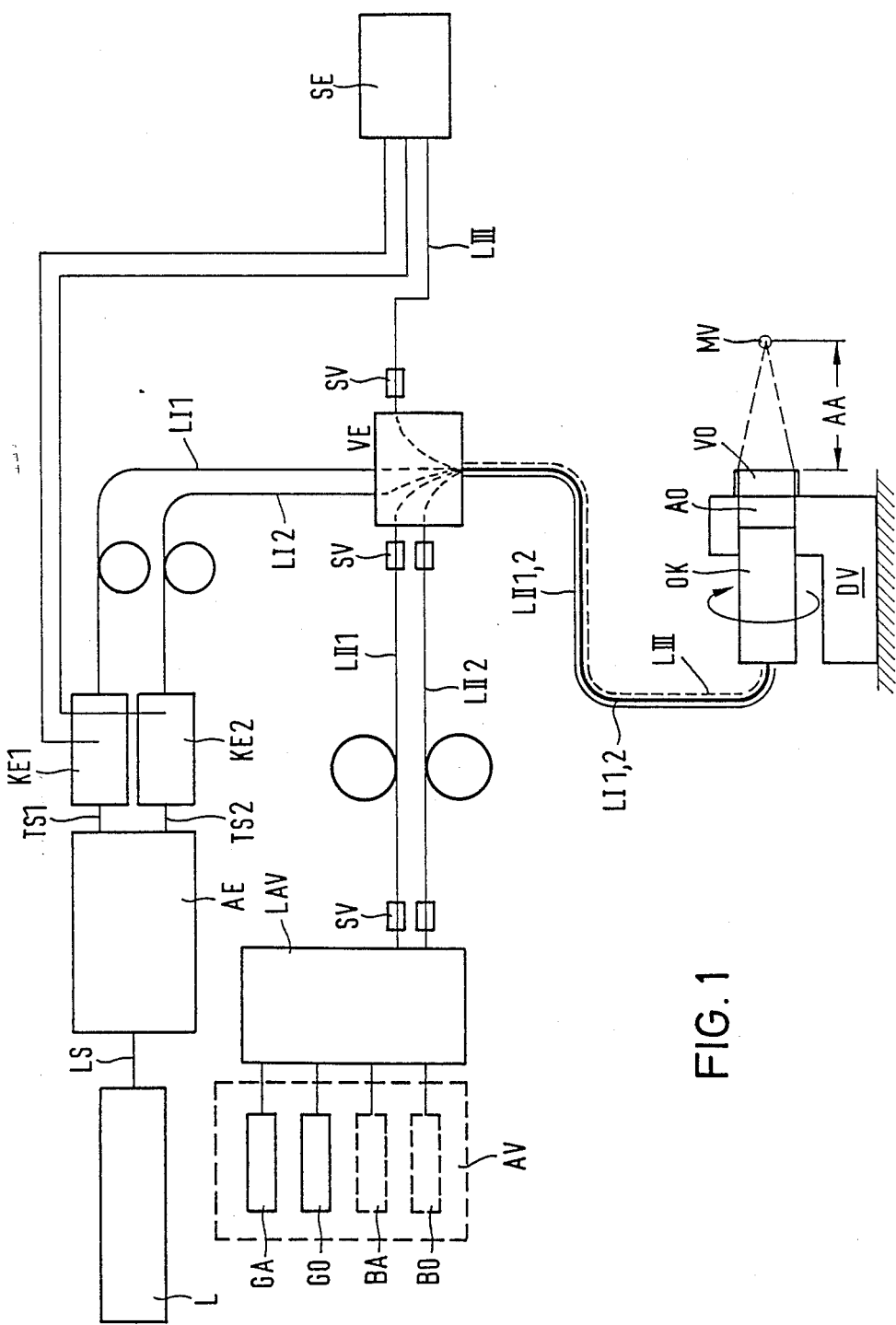
FIG. 1 is a basic view of an embodiment of the total assembly.

The following detailed description is of the best presently contemplated mode of carrying out the invention. This description is not to be taken in a limiting sense, but is made merely for the purpose of illustrating the general principles of the invention. The scope of the invention is best defined by the appended claims.

In the embodiment shown in FIGS. 1 to 4, the laser beam LS of a laser source is directed to a divider unit AE which contains a dispersion beam divider to split up the laser beam into two parallel partial beams TS1 and TS2. In case of a multicolored laser beam LS, generated, for instance, by an $Ar^+$-ion laser, the partial beam TS1 is composed, for instance, of green light, while partial beam TS2 is formed of blue light. Each partial beam is coupled, via an element KE1 or KE2, to one of the first light guides LI1 or LI2. Said two first light guides LI1 and LI2 traverse continuously, without interruption, the distributer unit VE to reach an optical head OK comprising a cylindrical housing which, by a revolving mechanism DV, is supported rotatably around its longitudinal axis. The front end of the optical head OK includes exchange optics AO having preset exchangeable auxiliary optics VO, which, with respect to head OK, may be stationary. The auxiliary optics VO focus, at a distance AA of about 100 mm, the transmitting beams wich leave in parallel from the optical head OK. The measuring volume MV is situated inside a flow channel at a focusing point. As soon as a solid particle contained in the flow traverses the measuring volume MV, it flashes up. Via the second light guides LII1 and LII2, the light emitted by the particle is conducted out of the optical head and to the light receiving means LAV which is connected to the evaluating means AV. The evaluating means AV comprises a start pulse generator GA for the start pulses of the green beam, a stop pulse generator GO for the stop pulses of the green beam, a start pulse generator BA for the start pulses of the blue beam and a stop pulse generator BO for the stop pulses of the blue beam. The time interval between start pulses and stop pulses is indicative for the speed of the particles passing the range between two focusing points.

FIGS. 2 and 3 show the path of the beams in the optical head OK. Beams emerging divergently from the first light guides LI1 and LI2 are directed in parallel by a respective lens L1 or L2 and are conducted through a respective hole H of the second lens system LS2. Green and blue beams G and B extend in parallel to, and are spaced from, the optical axis of the optical head OK to a polarization beam divider PP (Wollaston or Rochon prism), where each color beam is split into two beam pairs polarized vertically to each other. As evident from FIG. 2, the two differently colored beam pairs G and B intersect in the measuring volume MV at two points FGA, FGO where light is polarized differently. Light emitted from said two points, when they are traversed by a particle, is collected by the first lens system LS1, mounted in advance of the polarization beam divider PP, and is returned coaxially with the optical axis as indicated by the shaded part of the drawing. Along the optical axis and behind the second lens system LS2, there is provided another polarization beam divider PP2, arranged to split light that is focused by the perforated second lens system LS2. The light is split into two portions polarized vertically to each other and is conducted to the second light guides LII1, LII2. Thus, each of the second light guides LII1 and LII2 is aligned to a respective point of intersection FGA or FGO in the measuring volume MV. The two-color stray light, split in the light receiving means LAV into the individual colors G and B, is conducted by the second light guides. By this means, one obtains four signals separated as to polarization directions and colors, viz. the green start signal for start signal generator GA, the green stop signal for stop signal generator GO, the blue start signal for start signal generator BA and the blue stop signal for stop signal generator BO.

As evident from FIG. 3, due to the polarization beam divider PP, the incident green beam is split into two diverging beams which extend in a common plane. The blue beam B extending beneath the green beam is also split, simultaneously, into two beams polarized vertically to each other and of which each intersects one of the green beams in the measuring volume MV. The green focusing point FGA, provided for the production of the start pulses, is coincident with the blue start focusing point, while the green focusing point FGO, provided for the production of stop signals, coincides with the blue stop focusing point BGO, such as described in a similar way in German patent No. 31 45 987. Hence, the optical head OK of FIG. 2 is working in accordance with the three component process. If it is turned about its longitudinal axis, the vector means; i.e. the direction of the straight line traversing the focusing points, may be changed.

For coupling the first light guides LI1 and LI2 to the divider unit AE, in other words, for feeding the partial beams TS1 and TS2 into the first light guides, use is made of coupling elements KE1 and KE2. One of such coupling elements is shown schematically in FIG. 4 and comprises a plug 10, integrally connected with light guide LI and in which the end of the latter is fixed, said plug also comprises lens 11 focused to the end of the light guide. Plug 10 is fixed to an adjusting means 12, mounted by itself on a holder 17 firmly connected to the laser and including mechanical adjusting members 13, 14, 15, 16 for changing the position of the plug 10 in relation to holder 17. The adjusting members 13 and 14 are required to perform linear movements transversely to the axis of laser beam LS, while adjusting members 15 and 16 are provided to perform an angular movement in two planes extending vertically to each other. By this means, it is possible to align plug 10 relative to laser beam LS so that the light of the laser beam is fully incident on the core of the light guide LI.

Figure 4:
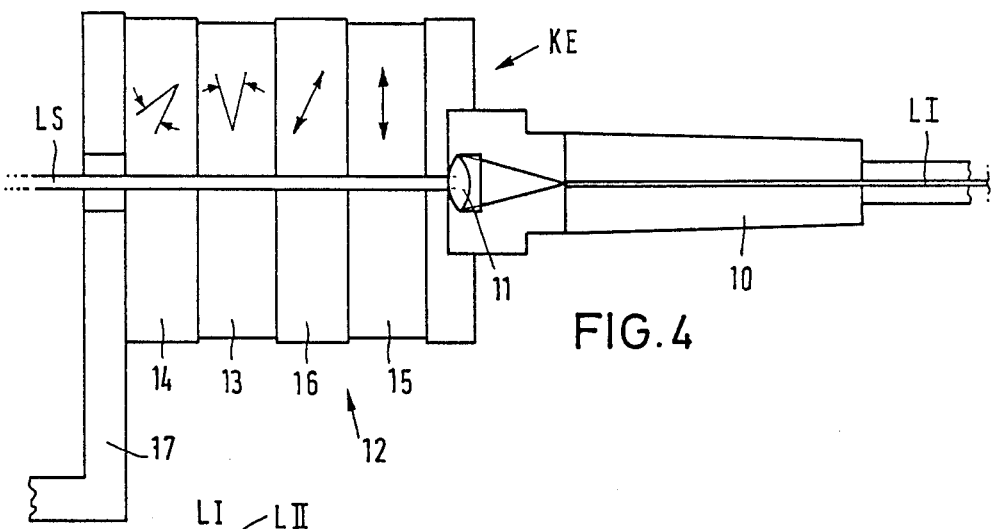
FIG. 4 is a schematic view of an embodiment of a coupling element to couple the laser beam into a first light guide.

The adjusting means 12 is controlled by control unit SE (FIG. 1) so that, via the respective first light guide LI, the maximum amount of light is provided the optical head OK. To this effect, the rear end of the optical head OK (FIG. 2) comprises a third light guide LIII for collecting the light emerging from light guides LI1 and LI2 and reflected and dispersed by the various optical components in the optical head. Said light guide LIII extends to the control unit SE, which contains a photoreceiver for converting light into electric signals. By manually setting the control unit SE, the means 12 shown in FIG. 4 is adjusted so that the maximum amount of light is received by the third light guide LIII. In such a case, the coupling element KE is correctly set. Such a fine adjustment is necessary, but only in case of single mode light guides rather than in case of multimode light guides LII and LIII, which may be also joined by plug connections with instruments and among each other without considerable resultant losses of light because multimode light guides have a relatively thick core of a light-conducting quality.

Figure 5:
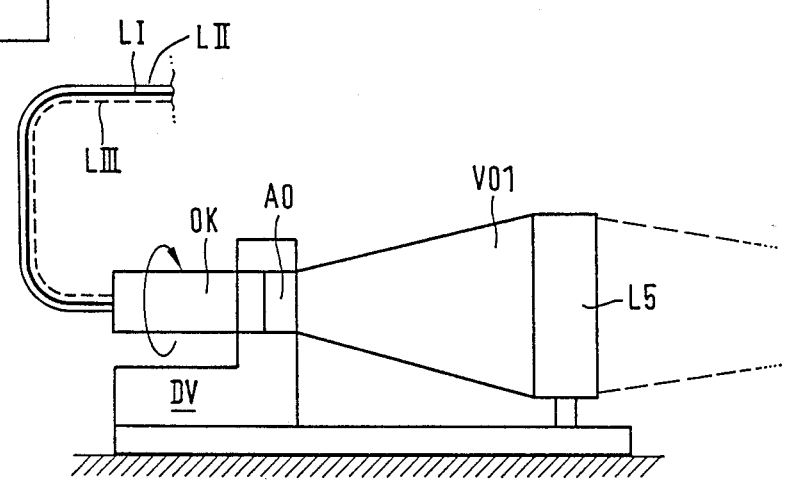
FIG. 5 shows the use of an embodiment of an optical head in association with other adapter optics.

FIG. 5 shows the optical head OK in connection with auxiliary optics VO1 for allowing the adjusting of larger operating distances. Due to said auxiliary optics VO1, the parallel beam of the optical head OK is expanded by a negative lens and is subsequently collected by a lens system LS of a corresponding larger size, which images the measuring volume at the desired larger distance. The auxiliary optics VO1 are nonrotatable, while the optical head OK is rotatable in the in the rotating device DV.

Figure 6:
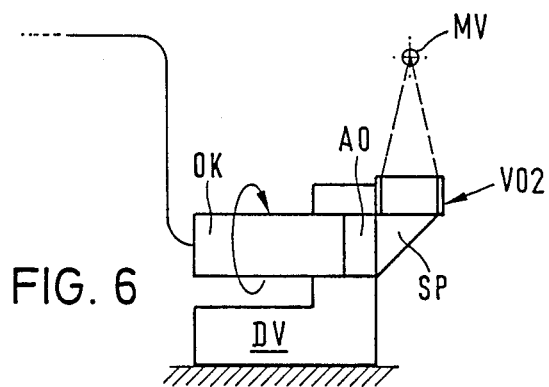
FIG. 6 is a view similar to FIG. 5 concerning another adapter system of optics.

The auxiliary lens VO2, shown in FIG. 6, serves to provide a bent beam path with the use of a mirror prism SP. The direction from which the beams strike the measuring volume MV extends at an angle with respect to the optical axis of the optical head OK. The embodiment of FIGS. 7 and 8 corresponds substantially to that of FIGS. 2 and 3. Both optical head are operating according to the three-component measuring method.

Into optical head OK1 of FIGS. 7 and 8, there is introduced one sole first light guide LI whose divergently emerging laser beam, directed in parallel by lens L1, is guided to a dichroic beam divider FT. The beam divider FT splits the multicolored laser beam into a rectilinear blue partial beam B and a green partial beam G, deflected at a right angle with respect to the blue partial beam. The green partial beam G being deflected rectangularly by prism P, subsequently extends in parallel to the blue partial beam B and is spaced from the optical axis of the optical head OK1. Behind the beam divider FT and behind prism P, there are provided respective line filters F1 and F2 for eliminating the residual color portions. Beam divider FT and prism P are positioned in the beam path of the incoming laser beam in advance of the second lens system LS2. As evident, in said system, both of the differently colored partial beams are produced within the optical head OK1, to which only one sole multicolored laser beam is directed. In this case, the splitting unit AE according to FIG. 1 is not required, but the laser beam LS may be coupled into one of the coupling elements KE1 or KE2.

FIG. 9 shows the beam path in an optical head OK2 of a system operating according to the two-component method in which more than two partial beams of different colors are generated which cause more than two focusing points F1, F2, F3, along a common straight line in the measuring volume. Only two focusing points, for the start and stop pulses, are required for the evaluation. Two respective focusing points may be selected whose distance is suitable for measurement. In the instant case, to better explain matters, only three different colors resulting in three focusing points are shown, while, in practice, a greater number of focusing points may be produced.

According to FIGS. 9 and 10, a multicolored laser beam is supplied to the optical head OK2 through one sole first light guide LI of a single-mode type, the end of the light guide LI being on the optical axis of optical head OK2. The divergent beam emerging from light guide LI is directed, through a centered hole H of the second lens system LS2, to lens L1, where the divergent beam is directed in parallel with the optical axis and is guided through a dispersion prism DP by which the multicolored beam is split into partial beams TS1, TS2, and TS3 of different colors. The partial beams are focused by the first lens system LS1 at different focusing points F1, F2, and F3 of the measuring volume MV. The radiation which is reflected by a particle appearing in the measuring volume is returned along the shaded beam path through the first lens system LS1, the dispersion prism DP and the second lens system LS2, in coaxial direction with respect to the optical axis of the optical head OK2. The second lens system LS2 focuses the radiation on the inlet of the sole second light guide LII.

By another (non-illustrated) dispersion prism, the beam leaving the second light guide LII is split in the light receiving means LAV into different colors, among which those whose signals are supplied to the evaluating means AV may be selected.

Figure 11:
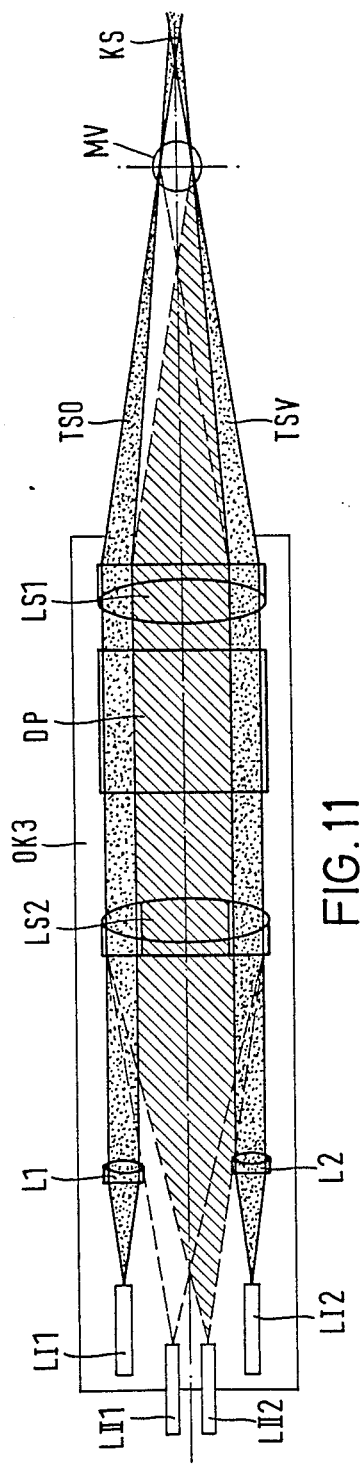
FIG. 11 shows a vertical section of an embodiment of an optical head comprising more than three focusing points, the forward running partial beams intersecting behind the measuring volume.
Figure 12:
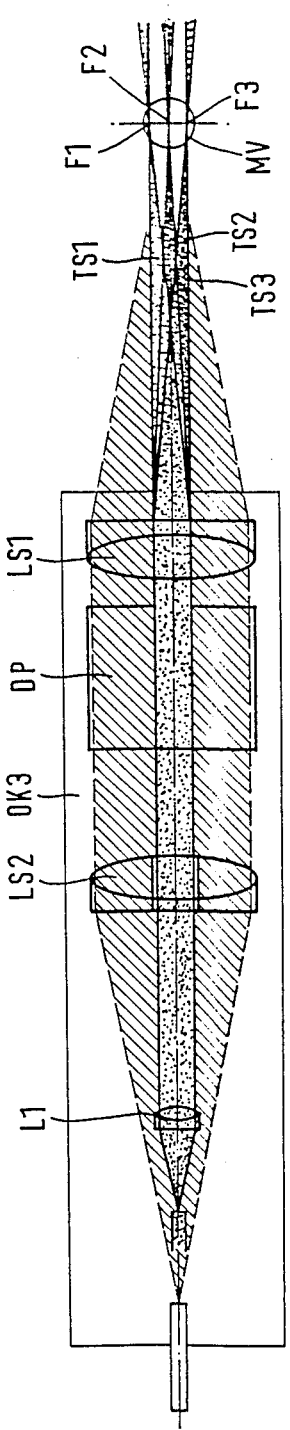
FIG. 12 shows a horizontal section of the optical head of FIG. 11.

The optical head of FIGS. 11 and 12 operates according to the three-component method with multicolor beam splitting. The first light guides LI1 and LI2 are of the single-mode type which, however, do not maintain polarization. The embodiment of FIGS. 11 and 12 substantially corresponds to that of FIGS. 2 and 3, except for the fact that in place of polarization beam divider PP, a dispersion beam divider DP (as in FIGS. 9 and 10) is provided. If the two partial beams TSO and TSV, emerging from the two light guides LI1 and LI2, traverse the dispersion prism DP, each of said partial beams is split into a number of differently colored partial beams TS1, TS2, and TS3. The two partial beams TS1 from TSO and TSV are each focused in the measuring volume MV. If the partial beams TS1 of the upper and lower beam TSO and TSV intersect at their focusing points, then their light signals are separated from one another only when both beams TSO and TSV are polarized differently. Such a different polarization may only be realized either in the divider unit AE (FIG. 1) or in optical head OK3. If the first light guides LI1 and LI2 are not of the polarization-maintaining type, and if no polarization filters are contained in optical head OK3, it is possible, according to FIGS. 11 and 12, to cause beams TSO and TSV to not intersect in the measuring volume MV, defined by the focusing points F1, F2, F3, but rather to provide the point of intersection KS at a distance from the measuring volume MV such as illustrated in FIG. 11. In such a case, the focusing points of the upper beam TSO are imaged on the inlet of light guide LII2, while the focusing points of the lower beam TSV are imaged on the inlet of light guide LII1.

It is also possible, in case of the embodiment of FIGS. 11 and 12, to provide a beam divider FT and a prism P according to FIGS. 7 and 8, such that only one sole first light guide LI will be necessary.

Figure 13:
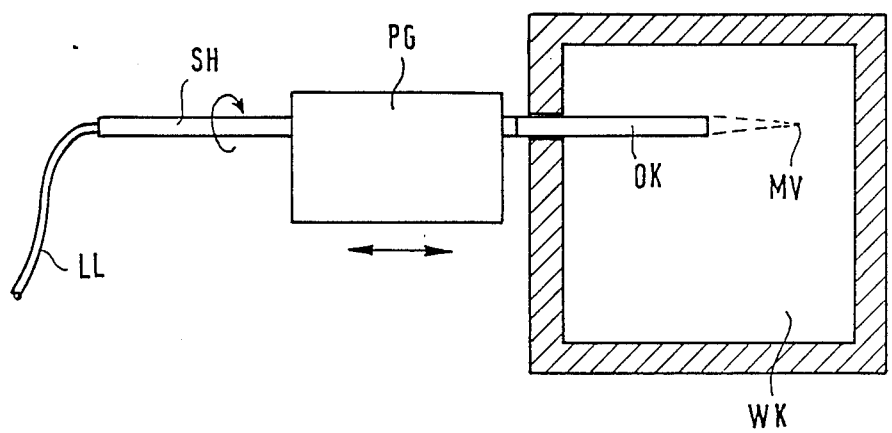
FIG. 13 is a schematic view showing the use of an embodiment of the assembly in a wind tunnel.

FIG. 13 shows an applicability of the device in a wind tunnel WK. The optical head OK is secured to shaft SH of a positioning means PG provided outside of the wind tunnel. Due to the positioning device PG, shaft SH may be rotated about its longitudinal axis and displaced in a longitudinal direction. Said shaft and optical head OK project through an opening of the wind tunnel wall so that the front end of the optical head is in the wind tunnel and is positioned at a specific distance from the measuring volume MV. At least one light guide LL extends from the optical head OK, through the hollow shaft Sh, to the light receiving means or to a distributer unit. The known measuring means for measuring flow vectors are always arranged outside of the wind tunnel, and their beam path is directed through a window provided in said wind tunnel. Since the resultant distance between the optics and the measuring volume is long, lenses of large diameters have to be used in the optics and a strong laser beam is required to illuminate the measuring volume. For the same reason, large windows are to be provided in the wall of the tunnel which, sometimes, may not be incorporated in view of the geometric conditions. By using an optical head of a small diameter, however, optics may be introduced through a small wall bore into the wind tunnel. The selected distance between optics and measuring volume may be dimensioned so that reactions of the optics on the current in the measuring volume may not become effective.

The embodiment of FIG. 14 deals with light guide LI, of a monomode type, having polarization-maintaining properties. The light supplied to said light guide LI is polarized at 45°. In the polarization prism PP1, the forward-running light is split into two mutually polarized beams of the same intensity which have different exit angles and are spatially separated accordingly. Due to lens LS1, positioned downward of the polarization prism PP1, two focused beams S1 and S2, which have different direction of polarization are obtained in the measuring volume MV. Beam S1 is polarized in parallel and beam S2 is polarized in vertical direction. The scattered light from measuring volume MV is collected by the external region of lens LS1 and conducted through the polarization beam divider PP1 whereby the splitting into the two polarization directions is annulled again. The further polarization beam divider PP2, provided with a central opening, is used to image, by means of lens LS2, the differently polarized scattered light from the focusing points on two coupling units LII1$_f$ and LII2$_f$ spaced sufficiently from each other and from which extend light guides LI1 and LII2 to an (non-illustrated) evaluating unit for producing start and stop signals by corresponding photodetectors. This device is advantageous because the mutual distance between the focusing points may be changed by interchanging the polarization prism PP1, positioned in the forward beam path without the need of other readjustments.

The presently disclosed embodiments are to be considered in all respects as illustrative and not restrictive, the scope of the invention being indicated by the appended claims, rather than the foregoing description, and all changes which come within the meaning and range of equivalency of the claims are, therefore, intended to be embraced therein.

What is claimed is:

1. An apparatus for measuring flow vectors in gas currents, comprising:
   a laser light source,
   a subsequently positioned beam divider for dividing the laser light into partial beams,
   a first lens system for focusing at juxtaposed points in a measuring volume the partial beams emitted from the beam divider,
   a second lens system for directing the light of the measuring volume to a light receiving means which splits the light received from the measuring volume into spatially separate components corresponding to the partial beams,
   an evaluating means connected to the light receiving means for producing a start pulse whenever a particle passes the focusing point of a partial beam and producing a stop pulse whenever the same particle subsequently passes the focusing point of another partial beam,
   an optical head, rotatable about its optical axis, for accommodating the first lens system and the second lens system and into which light of the laser light source is introduced via at least one flexible first light guide,
   at least two partial beams emerging from the front end of the optical head being focused at different points in the measuring volume,
   at least one second light guide, on which radiation emitted from the measuring volume is focused, having an end arranged in the optical head behind the second lens system,
   at least one third light guide, extending out of said optical head, for receiving the light of the second lens system,
   a control unit, connected with said at least one third light guide, and
   a coupling element adjustable to feed the laser beam into the first light guide so that the third light guide receives a maximum light quantity,
   wherein the first light guide is connected to the laser light source while the second light guide is connected to the light receiving means.

2. An apparatus according to claim 1, further comprising a dispersion bead divider disposed in the optical head, between the first and the second lens system.

3. An apparatus according to claim 1, further comprising a nonrotatable, interchangeable auxiliary optical unit mounted in front of the optical head.

4. An apparatus according to claim 1, wherein two first light guides extend, in parallel and in spaced relationship to the optical axis, into the optical head.

5. An apparatus according to claim 1, further comprising:
 a beam divider into which light emitted from one sole first light guide, extending into the optical head, is directed; and
 a deflection means into which one partial beam is directed so that two partial beams are produced which extend at a distance from the optical axis.

6. An apparatus according to claim 1, further comprising a polarization beam divider disposed behind the second lens system in the optical head for splitting the light emitted from the measuring volume into two components; and a second light guide, to which said two components are conducted.

7. An apparatus according to claim 2, wherein said beam divider is a dispersion beam divider for producing more than two differently colored partial beams which are focused at different points in the measuring volume.

8. An apparatus according to claim 7, wherein two beams, each of which is split into at least two partial beams, intersect at a distance from the measuring volume.

9. An apparatus according to claim 1, wherein said first light guides are of the single mode type, while the second light guides are of the multimode type.

10. An apparatus according to claim 1, further comprising: a polarization beam divider disposed between said first and second lens systems in said optical head.

11. An apparatus for measuring flow vectors in gas currents, wherein the flash-ups of radiation emitted from particles contained in said gas currents and traversing points where partial beams of a laser beam are focused, are collected and evaluated, said apparatus comprising:
 a first lens system for focusing at least two of said partial beams onto at least two spatially separated points, respectively;
 a second lens system for collecting said flash-ups of radiation from particles traversing said at least two spatially separated points;
 an optical head, rotatable about its optical axis, for housing said first and second lens system;
 at least one first light guide for guiding said laser beam to said optical head;
 at least one second light guide for guiding said radiation collected by said second lens system away from said optical head;
 at least one third light guide for collecting the light emerging from said first light guides and said second light guides,
 a control unit, connected with said at least one third light guide, and
 a coupling element adjustable to feed the laser beam into the first light guide so that the third light guide receives, a maximum light quantity, and
 an evaluating means for evaluating said radiation guided by said at least one second light guide.

12. An apparatus as claimed in 11, further comprising: at least one adjustable coupling element for coupling said laser beam with said at least one first light guide, said coupling element being adjustable for adjusting the quantity of said laser beam incident on the core of said at least one first light guide.

13. An apparatus as claimed in claim 12, further comprising: a control unit having means for setting said adjustable coupling element so that the maximum amount of said laser beam is incident on the core of said at least one first light guide.

14. An apparatus for measuring flow vectors of particles in gas currents flowing through a measuring volume, comprising:
 a laser light source for emitting a laser beam;
 a beam divider for dividing said laser beam into a plurality of partial beams;
 a first lens system for focusing at least two of said plurality of partial beams onto at least two spatially separated units, respectively, within said measuring volume;
 a second lens system for collecting light reflected from said particles flowing through said measuring volume and traversing said at least two points;
 an optical head, rotatable about its optical axis, for housing said first and second lens systems, said optical head having a front end from which said at least two partial beams emerge;
 at least one first light guide, connected with said laser light source, for guiding light emitted from said laser light source to said optical head;
 at least one second light guide, for guiding light collected and focused thereon by said second lens system;
 at least one third light guide for collecting the light emerging from said first light guides and said second light guides,
 a control unit, connected with said at least one third light guide, and
 a coupling element adjustable to feed the laser beam into the first light guide so that the third light guide receives a maximum light quantity, and
 an evaluating means, connected with said at least one second light guide, for evaluating said light guided by said second light guide.

* * * * *